Oct. 31, 1939.  H. M. PIERCE ET AL  2,178,106
CALK DEVICE
Filed June 13, 1938
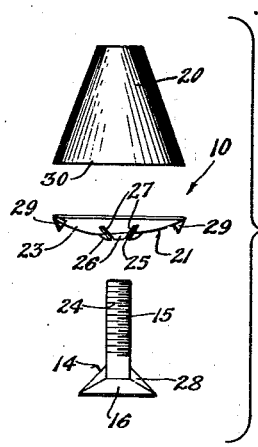
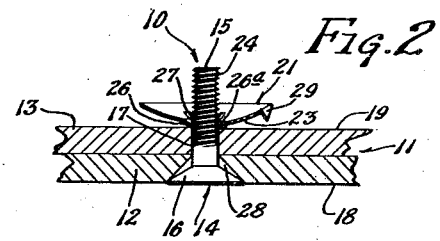
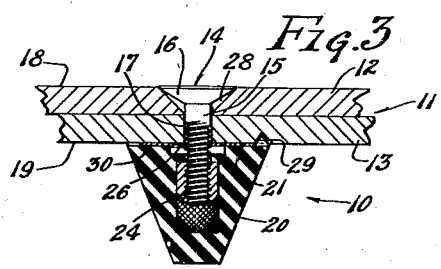
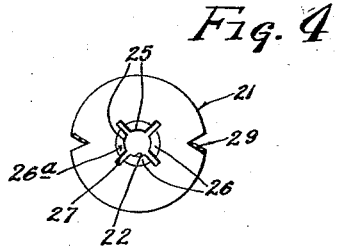
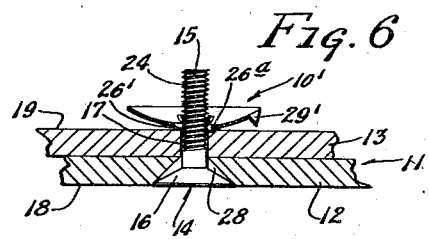
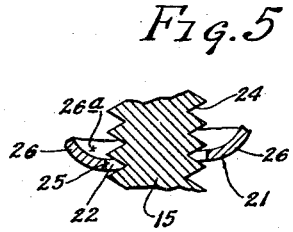
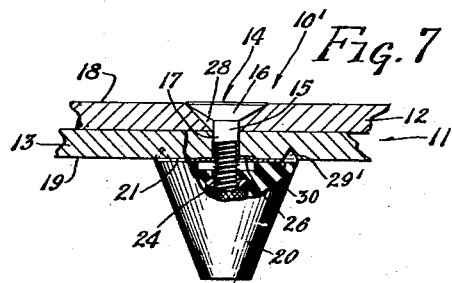
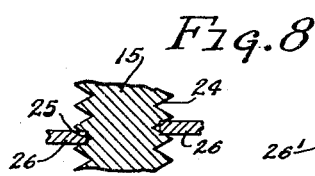
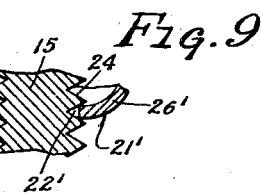
INVENTORS
HOWARD M. PIERCE
JOHN H. HERMSON
BY
ATTORNEY Patented Oct. 31, 1939

2,178,106

UNITED STATES PATENT OFFICE 2,178,106

CALK DEVICE

Howard M. Pierce and John H. Hermson, Brooklyn, N. Y., assignors to A. G. Spalding & Bros. Inc., New York, N. Y., a corporation of Delaware Application June 13, 1938, Serial No. 213,429

5 Claims. (Cl. 36—59)

This invention relates to a calk device, and more particularly to an improved means for associating a calk with a shoe sole.

In the prior calk device of which the present invention is an improvement, there is provided a threaded stem insertable through an aperture in the shoe sole. A flange or head is provided on the threaded stem to overlap the upper side of the sole and thus maintain the stem from longitudinal movement in one direction. Positioned on the stem and overlapping the bottom or underside of the sole is a calk-engaging washer which is held in position by a conventional nut.

This prior device has been used extensively and has proved to be generally quite satisfactory. However, it has been found that when the calk is unscrewed, as for the purpose of replacing the same, sometimes the washer and the nut both adversely come off with the calk. This is due to the fact that in use, the calk, which is frequently formed of hard rubber, corrodes or otherwise forms a strong adhesive bond with the washer and the nut. Thus, as the calk is unscrewed the washer and nut are adversely removed concurrently therewith.

Because of this adherence of the washer and the nut to the calk when the latter is unscrewed it becomes necessary, when a new calk is used, to either use a new washer and a new nut or use a special tool to pry the old nut and washer from the old calk. Also, after the washer and nut are pried from the old calk, or when a new replacement washer and nut are used, it is necessary to find and use a wrench in order to secure the washer and nut firmly to the sole before the calk is secured thereto.

Moreover, because of the removal of the washer and nut concurrently with the removal of the calk the threaded stem is left unsupported at the underside or bottom of the sole. Because of this there is the danger of the threaded stem being inadvertently loosened after the old calk has been removed and before a new calk is screwed thereon, thus resulting in the danger of having a new calk not properly and securely held in place.

It is an object of the present invention to provide a calk device in which the disadvantages of the prior device are eliminated.

An important feature of the present invention, therefore, resides in providing a calk device in which the calk-engaging and -supporting washer is securely locked on the threaded stem so that it will not be removed concurrently with the calk.

A complemental feature of the invention is the provision of an improved calk device in which not only does the washer grip and bite into the threaded stem to prevent its undesired removal with the calk, but also the washer so grips the sole and so grips the threaded stem that the latter is positively held from turning.

In achieving these important objects and features there is provided by the present invention a calk device in which the calk-supporting and -engaging cupped washer is so formed that while in its initial form it may be readily inserted on the threaded stem, when it is subsequently flattened it grips and bites into the threaded stem to be positively locked thereon.

Thus, an important feature of the present invention resides in providing a calk device in which the calk-engaging and -supporting washer alone so grips the threaded stem that no other means is required to hold the same in place.

A further feature of the present invention is the provision of stud-locking means which prevents the stud from moving back or turning in the shoe, so that the head thereof is always flat and comfortably disposed on the inner face of the sole, and can never project adversely therefrom.

Another feature is the provision of a more economical calk-holding structure, which, in the present instance, comprises a single concavo-convex washer which disposes with the more costly double washer-and-nut structure heretofore used, and at the same time holds the calk-supporting stud very securely to the sole.

A still further feature is the provision of a washer, forming a calk seat, provided with a plurality of sets of prongs, some of which are adapted to grip the calk-supporting stud and others of which are adapted to grip or lock the washer to the face of the sole to prevent it from turning relative thereto.

Yet another, and important, feature of the present invention is the provision of a washer with a convex face which may be screwed upon the calk-holding screw and partly into the outer face of the sole, to draw the head of the stud snugly against the inner face of the sole and which sets the stud more firmly therein, as the washer is deformed from a concavo-convex to a flat shape.

Other objects and features will hereinafter appear.

In the drawing:

Figure 1 is an exploded view of the calk device provided by the present invention.

Fig. 2 is a view partly in section, of the slip-type calk device started upon a shoe sole.

Fig. 3 is a sectional view of the Fig. 2 calk device in fully assembled condition.

Fig. 4 is a plan view of the novel lock washer provided by the present invention.

Fig. 5 is a fragmentary detail of the slip-type washer.

Fig. 6 is a view partly in section, similar to Fig. 2, but shows the screw-type calk device of the present invention.

Fig. 7 is a sectional view of the calk device of Fig. 6 in fully assembled condition.

Fig. 8 is a fragmentary view of the washer provided by the present invention, in flattened condition.

Fig. 9 is a fragmentary view of the screw-type washer provided by the present invention.

Before describing the present improvements and mode of operation thereof in detail it should be understood that the invention is not limited to the details of construction and arrangement of parts shown in the accompanying drawing, which are merely illustrative of the present preferred embodiments, since the invention is capable of other embodiments, and the phraseology employed is for the purpose of description and not of limitation.

Referring more particularly to the drawing and first to Figs. 1 through 5, there is shown a novel calk device 10, constituting the subject matter of the present invention and designed to be attached to a shoe sole 11 which, as shown, may include an upper layer 12 and a lower layer 13.

As is conventional this novel calk device 10 includes a screw member 14 with a threaded stem 15 and a head 16. When the screw member is inserted in any suitable aperture 17 in the shoe sole, the head 16 overlaps the upperside 18 of the sole and the threaded stem 15 projects outwardly from the underside or bottom 19 of the sole. Instead of inserting the screw member 14 through both the upper and lower layers 12 and 13 of the sole it will be appreciated that it may be inserted only through the lower layer of the sole, the important factor being that the threaded stem 15 projects outwardly from the bottom of the sole so that a calk or cleat 20 may be screwed thereon in the usual manner.

Of particular importance, however, there is included in the calk device 10, in place of the conventional initially flat calk-supporting and -engaging washer, a novel washer 21.

The novel washer 21 is so formed that it is adapted to securely grip and bite into the threaded stem and thus be held from both turning and longitudinally moving on the threaded stem.

As shown in Fig. 2, this novel washer 21 which is thus adapted to be securely locked on the threaded stem 15, is initially of substantially cup or concavo-convex shape, is formed with a central aperture 22 for receiving the threaded stem, and is inserted on the threaded stem with its convex side 23 toward the bottom of the shoe sole.

In the form shown in Figs. 1 through 5, the aperture 22 of the cupped washer 21 is of a diameter slightly larger than the outside diameter of the threads 24 on the stem, so that the washer may be slipped freely on the threaded stem. Defining the aperture 22 are the free ends 25 of a plurality of circumferentially disposed radially extending prongs or projections 26 separated by radially extending slots 27 in the washer herein, occasionally referred to as the slip-type washer. Preferably, and as shown, the central portion of the washer surrounding the aperture is bulged outward slightly from the main body of the washer to form an annular depressed section 26a in the slotted area of the washer.

Also preferably, and as shown, the prongs 26 are pitched to correspond with the pitch of the threads on the threaded stem 15. This is important in that when the prongs 26 are subsequently forced into gripping engagement with the threaded stem they will more uniformly engage and bite into the threads within the outside diameter thereof.

When it is desired to associate the calk device 10 with the sole, the screw member 14 is inserted in the preferably preformed aperture 17 in the shoe sole so that the threaded stem 15 projects outwardly from the sole bottom 19. Radially extending webs 28 may be advantageously formed on the underside of the head to bite into the sole and prevent adverse turning of the screw member therein.

With the screw member in place the cupped washer is then inserted on the threaded stem so that its convex side 23 rests on the sole bottom. When the washer is in this position a suitable tool is pressed against the washer to flatten the same on the shoe sole.

Due to the initially cupped shape of the radially slotted washer 21, the flattening operation concurrently forces the free ends of the prongs to grip and actually bite into the threads of the stem 15, see Figs. 3 and 9. This flattening operation, therefore, embeds the prongs 26 in the threaded stem, thus breaking the threads and locking the washer against longitudinal movement on the stem and also locking the screw member against inadvertent unscrewing or loosening from the sole.

To further lock the washer 21 in position, a plurality of circumferentially disposed prongs or projections 29 are advantageously provided on the washer to extend from the convex side 23 thereof. As shown, these prongs 29 may be conveniently formed by lancing and punching out integral parts of the washer. With this construction, when the washer is flattened, the prongs 29 are forced into the sole concurrently with the forcing of the gripping prongs 26 into the threaded stem. These prongs may be located or formed at divers places upon the washer.

Following the flattening and locking of the washer 21 the calk is screwed in place with the base 30 thereof resting on the washer.

When after a period of time it is desired to remove a calk 20 from the shoe sole for the purpose of repair or replacement, even when there is a relatively strong adhesive bond between the calk and washer, the washer will not be screwed off with the calk. Thus, with the present invention there is eliminated that disadvantage of the prior calk devices with nut-secured washers, involving the frequent necessity of either using new washers and nuts, or using special tools to pry the old washers and nuts from the old calks when it was desired to replace a calk.

Moreover, with the present invention, not only is the calk-supporting washer and the threaded stem more securely held in place than in the prior calk devices, but this is accomplished in a structure in which the need for a washer-holding nut is eliminated.

In Figs. 6 through 9 a slightly modified form of calk device 10' is shown. This modified device is exactly the same as the form first described with the exception that it includes a modified cupped washer 21', herein, occasionally referred to as the screw-type washer.

As in the case of the cupped washer 21 this modified washer 21' includes a plurality of radially extending prongs 26' in a slightly depressed central section 26a of the washer, and having free ends 25' defining an aperture 22' for receiving the threaded stem.

Of particular importance, however, the aperture 22' defined by the radially extending prongs 26', which may be pitched to correspond with the pitch of the threads on the threaded stem 15, is of a diameter substantially the same as that of the pitch diameter of the threaded stem. The free ends 25' of the prongs, therefore provide a single thread cooperable with the threads formed on the screw member 14.

Thus when associating the calk device 10' with the shoe sole the cupped washer 21' is screwed on the threaded stem 15 instead of merely being slipped on the threaded stem as in the form first described. Because of the initial screw-threaded relationship between the stem 15 and the washer, the prongs of the washer may be easily forced and held slightly into the sole, see Fig. 6, prior to the subsequent flattening operation. This forced fitting of the washer 21' against the sole 11 serves to maintain the washer in proper aligned position on the stem so that there is no danger of its being bent out of line when it is subsequently flattened. Also, this initial forcing of the washer against the sole, facilitated by the screw-threaded engagement of the washer and stem, achieves a better gripping relationship between the washer and the sole and between the washer and the stem. Further, it enables drawing the head 16 of the screw member 14 snugly against or into the top section 12 of the sole, and the bulged section 26a serves as a fulcrum to pull the head down even more firmly as the washer is flattened.

As in the form first described, when the washer is flattened the free ends of the radially extending prongs are forced to bite into the thread of the stem 15 within the outside diameter and adjacent the root diameter thereof, see Fig. 8, thus biting into the threads on the stem and thus securely locking the washer relative to the screw member. A plurality of sole gripping teeth 29', which may be formed in a manner exactly the same as the teeth 29 on the washer 21, are preferably provided to bite into the bottom of the sole when the washer is flattened.

Preferably, with both main forms of the present invention the head 16 of the screw member 14 is provided with webs 28 to seat into the sole and further prevent the screw member 14 from turning.

After the washer 21' is flattened and securely locked to the screw member and to the sole, the calk 20 is screwed on the threaded stem and into engagement with the washer.

While in describing the association of the modified calk device 10' with the sole, the washer was stated to be turned to screw the same on the threaded stem, it is to be understood that the same result might be achieved holding the washer against rotation and turning the screw member therein.

Variations and modifications may be made within the scope of this invention and portions of the improvements may be used without others.

Having thus described the invention what I claim as new is:

1. The combination of a sole having an aperture; an externally-threaded stud in the aperture; a calk threaded to said stud; a washer on said stud having a portion for gripping the sole against relative rotation, and a different portion deformable on the stud substantially permanently to grip the threaded stem against relative rotation upon subsequent removal of said calk.

2. The combination of a sole having an aperture; an externally-threaded stud in the aperture; a calk threaded to said stud; a washer on said stud having substantially peripheral prongs parallel with said stud for gripping the sole against relative rotation, and a different portion deformable on the stud substantially permanently to grip the threaded stem against relative rotation upon subsequent removal of said calk.

3. The combination of a sole having an aperture; an externally-threaded stud in the aperture; a calk threaded to said stud; a washer on said stud having a portion for gripping the sole and an inner portion concavo-convex to permit slipping on stud and deformable on the stud substantially permanently to grip the threaded stem against relative rotation upon subsequent removal of said calk.

4. The combination of a sole having an aperture; an externally-threaded stud in the aperture; a calk threaded to said stud; a washer on said stud having a peripheral portion for gripping the sole against relative rotation and an inner portion offset to draw the stud into the aperture upon flattening of the stud.

5. The combination of a sole having an aperture; an externally-threaded stud in the aperture; a calk threaded to said stud; a washer on said stud having a portion for gripping the sole against relative rotation, and an inner portion having prongs pitched to correspond with the screw threading and deformable on the stud substantially permanently to grip the threaded stem against relative rotation upon subsequent removal of said calk.

HOWARD M. PIERCE.
JOHN H. HERMSON.